(12) United States Patent
Zhang et al.

(10) Patent No.: US 11,494,591 B2
(45) Date of Patent: Nov. 8, 2022

(54) MARGIN BASED ADVERSARIAL COMPUTER PROGRAM

(71) Applicant: International Business Machines Corporation, Armonk, NY (US)

(72) Inventors: Yang Zhang, Mount Kisco, NY (US); Shiyu Chang, Elmsford, NY (US); Mo Yu, White Plains, NY (US); David S. Kung, Chappaqua, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 973 days.

(21) Appl. No.: 16/245,489

(22) Filed: Jan. 11, 2019

(65) Prior Publication Data

US 2020/0226425 A1 Jul. 16, 2020

(51) Int. Cl.
*G06K 9/00* (2022.01)
*G06K 9/62* (2022.01)
*G06N 3/08* (2006.01)
*G06V 10/98* (2022.01)

(52) U.S. Cl.
CPC ......... *G06K 9/6262* (2013.01); *G06K 9/6267* (2013.01); *G06N 3/08* (2013.01); *G06V 10/98* (2022.01)

(58) Field of Classification Search
CPC .... G06K 9/6262; G06K 9/6267; G06K 9/627; G06N 3/08; G06N 7/005; G06V 10/98; G06V 10/764; G06V 10/82
See application file for complete search history.

(56) References Cited

U.S. PATENT DOCUMENTS

| 7,529,403 | B2 | 5/2009 | Ivanov |
| 10,521,718 | B1* | 12/2019 | Szegedy ............... G06N 3/084 |
| 2016/0328644 | A1 | 11/2016 | Lin et al. |

OTHER PUBLICATIONS

Goodfellow, Ian J., Jonathon Shlens, and Christian Szegedy. "Explaining and harnessing adversarial examples." arXiv preprint arXiv:1412.6572, 2014. (Year: 2015).*

(Continued)

*Primary Examiner* — Andrew M Moyer
(74) *Attorney, Agent, or Firm* — Amin, Turocy & Watson, LLP

(57) ABSTRACT

Techniques regarding a zero-confidence adversarial attack are provided. For example, one or more embodiments described herein can comprise a system, which can comprise a memory that can store computer executable components. The system can also comprise a processor, operably coupled to the memory, and that can execute the computer executable components stored in the memory. The computer executable components can comprise an adversarial component that computes a perturbation that causes misclassification by a neural network classifier. The computer executable components can also comprise a restoration component that determines a normal vector to a constraint contour developed by the neural network classifier. Further, the computer executable components can comprise a projection component that determines a tangential vector to the constraint contour.

20 Claims, 13 Drawing Sheets

(56) References Cited

OTHER PUBLICATIONS

Moosavi-Dezfooli, Seyed-Mohsen, Alhussein Fawzi, and Pascal Frossard. "Deepfool: a simple and accurate method to fool deep neural networks." Proceedings of the IEEE conference on computer vision and pattern recognition, 2016. (Year: 2016).*
Zhang, Yang, et al. "Margin Based Adversarial Attack." ICLR 2019. 14 pages.
Cao, Xiaoyu, et al. "Mitigating Evasion Attacks to Deep Neural Networks via Region-based Classification." ACSAC 2017, 2017 Annual Computer Security Applications Conference, Dec. 2017. 10 pages.
Xie, Cihang, et al. "Improving Transferability of Adversarial Examples with Input Diversity." arXiv:1803.06978v2 [cs.CV] Jun. 11, 2018. 19 pages.
He, Warren, et al. "Decision Boundary Analysis of Adversarial Examples." ICLR 2018 Conference. 15 pages.
Madry, Aleksander, et al. "Towards deep learning models resistant to adversarial attacks." arXiv:1706.06083v3 [stat.ML] Nov. 9, 2017. 27 pages.
Zheng, Stephan, et al. "Improving the robustness of deep neural networks via stability training." Proceedings of the IEEE Conference on Computer Vision and Pattern Recognition. 2016. 9 pages.
Rifai, Salah et al. "The manifold tangent classifier." Advances in Neural Information Processing Systems. 2011. 9 pages.
Mell, Peter, et al. "The NIST Definition of Cloud Computing." National Institute of Standards and Technology. Sep. 2011. 7 pages.

* cited by examiner

400

---

Algorithm : MARGINATTACK Procedure

Input : A set of logit functions $l_{0:C-1}(x)$;
an input feature $x_0$ and its label $t$;
Output: A solution $\tilde{x}^*$ to Eq. (1)
Initialize $x^{(0)}$ according to Eq. (15);
for $k <$ *number of iterations* do
    if $k <$ *number of target scan iterations* then
        Do target scan normal vector as in
        Eq. (14);
    else
        Do regular normal vector as in
        Eqs. (3) or (12);
    end
    if $k <$ *final tuning iteration* then
        Do tangential vector as in Eqs. (6);
    else
        Skip tangential vector : $x^{(k+1)} = x^{(k)}$;
    end
end
$\tilde{x}^* = x^{(k)}$.

MARGIN BASED ADVERSARIAL COMPUTER PROGRAM

BACKGROUND

The subject disclosure relates to a margin based adversarial computer program to analyze and/or train one or more neural network classifiers, and more specifically, to one or more zero-confidence adversarial attacks that can impose input perturbations to cause a neural network classifier to misclassify.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatuses and/or computer program products that can facilitate a zero-confidence adversarial attack on a neural classifier are described.

According to an embodiment, a system is provided. The system can comprise a memory that can store computer executable components. The system can also comprise a processor, operably coupled to the memory, and that can execute the computer executable components stored in the memory. The computer executable components can comprise an adversarial component that computes a perturbation that cause misclassification by a neural network classifier. The computer executable components can also comprise a restoration component that determines a normal vector to a constraint contour developed by the neural network classifier. Further, the computer executable components can comprise a projection component that determines a tangential vector to the constraint contour.

According to an embodiment, a computer-implemented method is provided. The computer-implemented method can comprise computing, by a system operatively coupled to a processor, a perturbation that causes misclassification by a neural network classifier. The computer-implemented method can also comprise determining, by the system, a normal vector to a constraint contour developed by the neural network classifier. Further, the computer-implemented method can comprise determining, by the system, a tangential vector to the constraint contour.

According to an embodiment, a computer program product for computing a perturbation that causes misclassification by a neural network classifier is provided. The computer program product can comprise a computer readable storage medium having program instructions embodied therewith. The program instructions can be executable by a processor to cause the processor to generate, by the processor, a convergence pathway through a hyperplane from an initial input to a point on a constraint contour developed by the neural network classifier. Also, the convergence pathway can comprise a normal vector to the constraint contour and a tangential vector to the constraint contour.

BRIEF DESCRIPTION OF THE DRAWINGS

FIG. 4 illustrates a diagram of an example, non-limiting algorithm that can be implemented by one or more systems to facilitate a zero-confidence adversarial attack on a neural classifier in accordance with one or more embodiments described herein.

DETAILED DESCRIPTION

Figure 1:
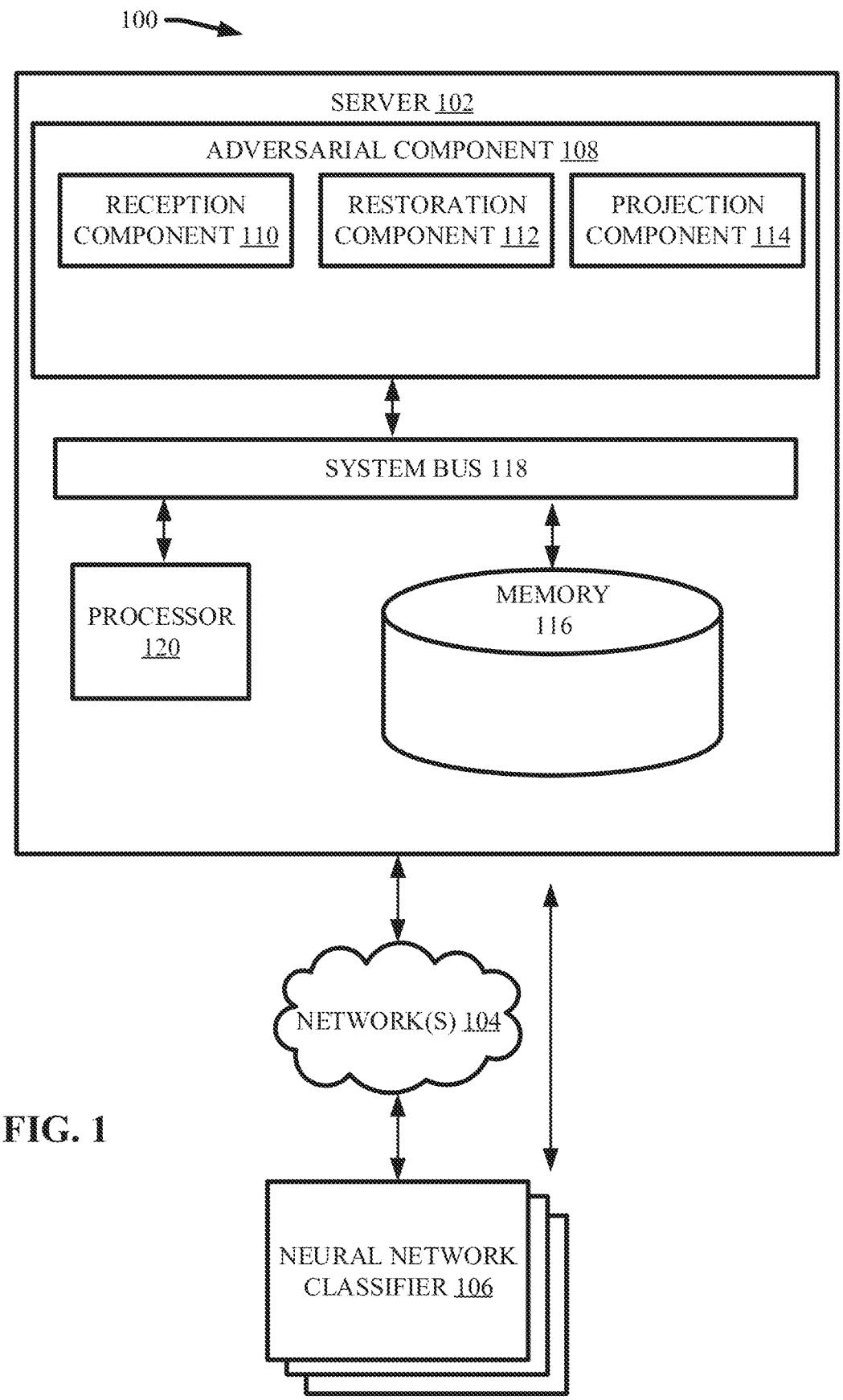
FIG. 1 illustrates a block diagram of an example, non-limiting system that can perform a zero-confidence adversarial attack on a neural network classifier in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

As used herein, the term "adversarial attack" can refer to the task of finding small and imperceptible input transformations that can cause a neural network classifier to misclassify. One or more types of adversarial attacks can have access to gradient information of the target neural network. There are two major paradigms of adversarial attacks that attempt to impose input perturbations. The first paradigm, called the fix-perturbation adversarial attack, tries to find perturbations that are most likely to cause misclassification, with the constraint that the norm of the perturbations cannot exceed a given level. Since the perturbation level is fixed, fix-perturbation attacks can fail to find any adversarial samples for inputs that are far away from the decision boundary developed by the neural network classifier. The second paradigm, called the zero-confidence adversarial attack, tries to find the smallest perturbations that are guaranteed to cause misclassification, regardless the size of the perturbations. Since zero-confidence adversarial attacks aim to minimize the perturbation norm, zero-confidence adversarial attacks can find adversarial samples positioned on and/or near the decision boundaries. The resulting perturbation norm is also known as the margin of an input feature to the decision boundary.

Both paradigms are essentially constrained optimization problems. The fix-perturbation adversarial attack can exhibit a simple convex constraint (e.g., perturbation norm), but a non-convex target (e.g., classification loss or logit differences). In contrast, the zero-confidence adversarial attack can exhibit a non-convex constraint (e.g., classification loss or logit differences), but a simple convex target (e.g., perturbation norm). Despite their similarity as optimization problems, the two paradigms differ significantly in terms of difficulty. The fix-perturbation attack problem is easier. While conventional fix-perturbation adversarial attack methods (e.g., projected gradient descent and/or distributional adversarial attack) can achieve both high efficiency and a high success rate; conventional zero-confidence adversarial attack methods (e.g., the fast gradient sign method and/or the limited-memory-Broyden-Fletcher-Goldfarb-Shanno algorithm) are inaccurate and/or time consuming.

Various embodiments of the present invention can be directed to computer processing systems, computer-implemented methods, apparatus and/or computer program products that facilitate the efficient, effective, and autonomous (e.g., without direct human guidance) execution of a zero-confidence adversarial attack against one or more neural network classifiers with improved accuracy and/or efficiency over conventional techniques. One or more embodiments can regard a zero-confidence adversarial attack that can iterate between a restoration vector and a projection vector to generate a convergence pathway within a hyperplane. The restoration vector can linearize the constraint and solves the simplified optimization problem. The projection vector can explore even smaller perturbations without changing the constraint values significantly. At least through the determination of restoration and/or projection vectors, the various systems, computer-implemented methods, and/or computer program products described herein can compute a smaller margin and/or run significantly faster than conventional zero-confidence adversarial attacks.

The computer processing systems, computer-implemented methods, apparatus and/or computer program products employ hardware and/or software to solve problems that are highly technical in nature (e.g., execute one or more zero-confidence adversarial attacks against one or more neural network classifiers), that are not abstract and cannot be performed as a set of mental acts by a human. For example, an individual, or even a plurality of individuals, cannot readily analyze the vast amount of gradient information of a neural network with the efficiency necessary to compute a minimal perturbation that causes a classifier of the neural network to misclassify.

FIG. 1 illustrates a block diagram of an example, non-limiting system 100 that can perform one or more zero-confidence adversarial attacks. Repetitive description of like elements employed in other embodiments described herein is omitted for sake of brevity. Aspects of systems (e.g., system 100 and the like), apparatuses or processes in various embodiments of the present invention can constitute one or more machine-executable components embodied within one or more machines, e.g., embodied in one or more computer readable mediums (or media) associated with one or more machines. Such components, when executed by the one or more machines, e.g., computers, computing devices, virtual machines, etc. can cause the machines to perform the operations described.

As shown in FIG. 1, the system 100 can comprise one or more servers 102, one or more networks 104, and/or one or more neural network classifiers 106. The server 102 can comprise adversarial component 108. The adversarial component 108 can further comprise reception component 110, restoration component 112, and/or projection component 114. Also, the server 102 can comprise or otherwise be associated with at least one memory 116. The server 102 can further comprise a system bus 118 that can couple to various components such as, but not limited to, the adversarial component 108 and associated components, memory 116 and/or a processor 120. While a server 102 is illustrated in FIG. 1, in other embodiments, multiple devices of various types can be associated with or comprise the features shown in FIG. 1. Further, the server 102 can communicate with a cloud computing environment via the one or more networks 104.

The one or more networks 104 can comprise wired and wireless networks, including, but not limited to, a cellular network, a wide area network (WAN) (e.g., the Internet) or a local area network (LAN). For example, the server 102 can communicate with the one or more neural network classifiers 106 (and vice versa) using virtually any desired wired or wireless technology including for example, but not limited to: cellular, WAN, wireless fidelity (Wi-Fi), Wi-Max, WLAN, Bluetooth technology, a combination thereof, and/or the like. Further, although in the embodiment shown the adversarial component 108 can be provided on the one or more servers 102, it should be appreciated that the architecture of system 100 is not so limited. For example, the adversarial component 108, or one or more components of adversarial component 108, can be located at another computer device, such as another server device, a client device, etc.

The one or more neural network classifiers 106 can be one or more neural networks used to perform one or more classification functions. The one or more neural network classifiers 106 can comprise a plurality of artificial neurons arrange in multiple layers, which can convert an input vector to an output. Each neuron can apply a function to a given input vector and pass the output to another layer. Additionally, weights can be applied to signals passing from one neuron to another, wherein the weights can be tuned in one or more training processes to adapt the one or more neural network classifiers 106 to the subject classification problem.

For example, the one or more neural network classifiers 106 can generate a hyperplane, wherein a collection of neurons clustered in a one region of the hyperplane can correspond to one or more features of one class, and a collection of neurons clustered in another region of the hyperplane can correspond to one or more features of another class. Further, the one or more neural network classifies 106 can generate a constraint contour within the hyperplane that corresponds to a decision boundary separating a plurality of classes from each other; thereby defining the one or more classifications made by the one or more neural network classifiers 106.

In various embodiments, the one or more neural network classifiers 106 can have output logits donated as "$l_0(x)$, $l_1(x), \ldots, l_{C-1}(x)$," where "C" can represent the total number of classes, for any data token "$(x_0, t)$", wherein "$x_0$" can be an n-dimensional input feature vector and $t \in \{0, \ldots, C-1\}$ can be its label. The one or more neural network classifiers 106 can send one or more outputs (e.g., the one or more output logits and/or gradient information regarding the one or more neural network classifiers 106) to the adversarial component 108 directly (e.g., via a direct electrical connection) and/or indirectly (e.g., via the one or more networks 104).

The adversarial component 108 can receive the one or more outputs of the one or more neural network classifiers 106 and can compute the minimal input perturbation that causes the one or more neural network classifiers 106 to misclassify. For example, the adversarial component 108 can determine the nearest point "$x^*$" along the constraint contour generated by the one or more neural network classifiers 106 from an initial input vector "$x_o$" to perform a targeted adversarial attack in accordance with Equation 1 below.

$$x^* = \underset{x}{\mathrm{argmin}}\, d(x - x_0), \text{ s.t. } c(x) \leq 0 \qquad (1)$$

Wherein "$c(x)$" can represent the constraint function and "$d(x-x_0)$" can be a norm, such as $\ell_2$ and/or $\ell_\infty$ norms. Additionally, for non-targeted adversarial attacks, the constraint can be defined by Equation 2 below.

$$c(x) = l_t(x) - \underset{i \neq t}{\max}\, l_i(x) - \varepsilon \qquad (2)$$

Wherein "$\varepsilon$" can represent an offset parameter, which can, for example, be set to a small negative number to ensure that the adversarial sample lies on the incorrect side of the constraint contour (e.g., the decision boundary), and "i" can represent the iteration number.

In one or more embodiments, the reception component 110 can receive the one or more outputs from the one or more neural network classifiers 106. For example, the reception component 110 can be operably coupled (e.g., via the one or more networks 104) to the one or more neural network classifiers 106. Further, the reception component 110 can also be operably coupled (e.g., directly and/or via the one or more networks 104) to the restoration component 112 and/or the projection component 114. Thus, the reception component 110 can facilitate sharing one or more outputs generated by the one or more neural network classifiers 106 with the restoration component 112 and/or the projection component 114.

The adversarial component 108 can generate a convergence pathway through the hyperplane generated by the one or more neural network classifiers 106 from an initial data point "$x^{(k)}$" to a data point on the constraint contour "$x^*$" that is nearest an original input "$x_0$" in accordance with Equation 1 and/or 2. For example, the convergence pathway can comprise one or more iterations of normal vectors determined by the restoration component 112 and/or tangential vectors determined by the projection component 114, wherein "k" can denote the iteration number.

The restoration component 112 can determine one or more normal vectors to the constraint contour at a given data point "$x^{(k)}$" on the hyperplane. The one or more normal vectors can serve to build the convergence pathway towards the constraint boundary (e.g., $c(x)=0$) with the shortest distance. For example, the restoration component 112 can determine the one or more normal vectors in accordance with Equation 3 below.

$$z^{(k)} = \underset{x}{\mathrm{argmin}}\, d(x - x^{(k)}), \text{ s.t. } \nabla^T c(x^{(k)})(x - x^{(k)}) = -\alpha^{(k)} c(x^{(k)}) \qquad (3)$$

Wherein "T" can represent matrix/vector transpose, "$z^{(k)}$" can represent a transition point from a normal vector to a tangential vector within a given iteration, and "$\alpha^{(k)}$" can represent a step size (e.g., within [0,1]) of the given iteration. The left-hand side of the constraint in Equation 3 is the first-order Taylor approximation of $c(z^{(k)})-c(x^{(k)})$; thus, the constraint can extend the convergence pathway closure to the constraint contour (e.g., $c(x)=0$) by the iteration step size "$\alpha^{(k)}$". In other words, because of the Taylor approximation the restoration component 112 can approximately reduce the distance to $c(x)=0$ by $\alpha$. Further, it can be shown from the dual-norm theory that the solution to Equation 3 can be Equation 4 below.

$$z^{(k)} = x^{(k)} - \frac{\alpha^{(k)} c(x^{(k)}) s(x^{(k)})}{\nabla^T c(x^{(k)}) s(x^{(k)})} \qquad (4)$$

Wherein "$s(x)$" can be defined such that $\nabla^T c(x) s(x) = d^*(\nabla^T c(x))$, wherein "$d^*(\bullet)$" can be the norm of "$d(\bullet)$". For instance, the dual norm of the $\ell_P$ norm can be the $\ell_{(1-P^{-1})^{-1}}$; thereby leading to Equation 5 below.

$$s(x) = \begin{cases} \nabla c(x) / \|\nabla c(x)\|_2 & \text{if } d(\cdot) \text{ is the } \ell_2 \text{ norm} \\ \mathrm{sign}(\nabla c(x)) & \text{if } d(\cdot) \text{ is the } \ell_\infty \text{ norm} \end{cases} \qquad (5)$$

Thereby, the restoration vector can extend the convergence pathway from an initial data point towards the constraint contour (e.g., the decision boundary). Further, the extension of the convergence pathway by the restoration vector can be optimized by a projection vector.

The projection component 114 can determine one or more tangential vectors along a tangent plane to the constraint contour in order to extend the convergence pathway towards the original input "$x_0$", while ensuring that the convergence pathway's distance from the constraint contour "$c(x)$" does not change drastically. Thus, the projection vector can extend the convergence pathway from the intermediate point "$z^{(k)}$" reached by the normal vector of the subject iteration to a second data point "$x^{(k+1)}$" that can serve as the initial data point for the next iteration (e.g., the next extension of the convergence path by one or more normal vectors and/or projection vectors). For example, the projection component 114 can determine the one or more tangential vectors in accordance with Equation 6 below.

$$x^{(k+1)} = z^{(k)} - \beta^{(k)} a^{(k)} \nabla d(z^{(k)} - x_0) - \beta^{(k)} b^{(k)} s(z^{(k)}) \quad (6)$$

Wherein "$\beta^{(k)}$" can represent the step size of the iteration within [0,1]. Also, $a^{(k)}$ and/or $b^{(k)}$ can be two scalars. The second term of Equation 6 can reduce the distance the original input "x0", while the third term can reduce the constraint (e.g., at least because $s(z^{(k)})$ and $\nabla c(z^{(k)})$ can have a positive inner product). Therefore, the tangential vector can strike a balance between reduction in distance from the original input and reduction in constraint.

The scalars $a^{(k)}$ and $b^{(k)}$ can have two designs. The first design can ensure the constraint values are substantially the same after the extension of the convergence pathway by the tangential vector. The first design can be characterized by Equation 7 below.

$$\nabla^T c(z^{(k)})(x^{(k+1)} - z^{(k)}) = 0 \quad (7)$$

Further, Equation 7 can have a solution characterized by Equation 8 below.

$$b^{(k)} = \frac{a^{(k)} \nabla^T c(z^{(k)}) \nabla d(z^{(k)} - x_0)}{\nabla^T c(z^{(k)}) s(z^{(k)})} \quad (8)$$

A second design can ensure the perturbation norm reduces roughly by $\beta^{(k)}$ (e.g., $d(x^{(k+1)} - x_0) \approx (1 - \beta^{(k)}) d(z^{(k)} - x_0)$. Whereupon, by the Taylor approximation, Equation (9) can be derived, as presented below.

$$\nabla^T d(z^{(k)} - x_0)(x^{(k+1)} - z^{(k)}) = \beta^{(k)} d(z^{(k)} - x_0) \quad (9)$$

Further, Equation 9 can have a solution characterized by Equation 10 below.

$$a^{(k)} = 1 - \frac{b^{(k)} \nabla^T d(z^{(k)} - x_0) s(z^{(k)})}{\nabla^T d(z^{(k)} - x_0) \nabla d(z^{(k)} - x_0)} \quad (10)$$

While Equations 8 and 10 exemplify two specific choices for scalars "$a^{(k)}$" and "$b^{(k)}$", in various embodiments the adversarial component 108 can execute the zero-confidence adversarial attack described herein with a convergence guarantee for a wide range of bounded scalars "$a^{(k)}$" and "$b^{(k)}$" that can satisfy some conditions. Advantageously, the one or more features executed by adversarial component 108 can provide a general and/or flexible framework for zero-confidence adversarial attack designs. For example, Equation 8 can be implemented for $\ell_2$ norms (e.g., the root mean squared distance), while Equation 10 can be implemented for $\ell_\infty$ norms.

Figure 2:
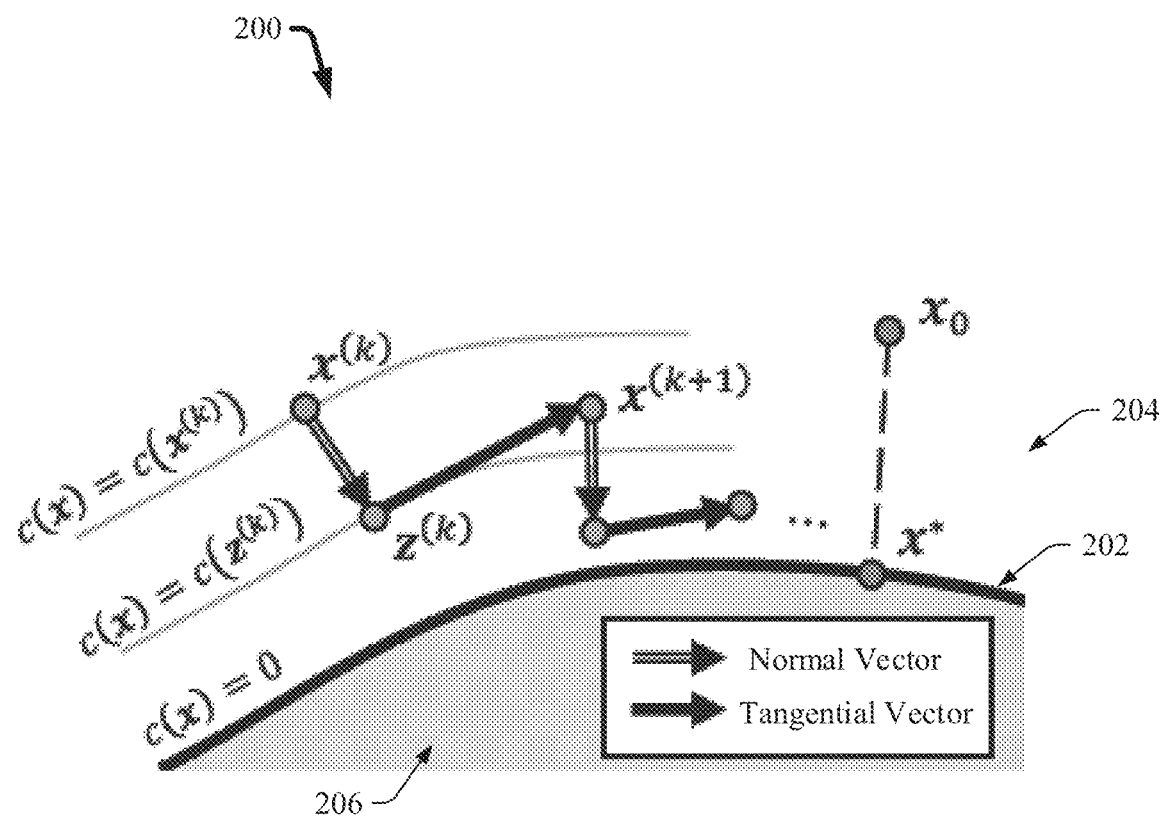
FIG. 2 illustrates a diagram of an example, non-limiting convergence pathway that can be generated by one or more systems to facilitate a zero-confidence adversarial attack on a neural network classifier in accordance with one or more embodiments described herein.

FIG. 2 illustrates a diagram of an example, non-limiting convergence pathway 200 that can be generated by the adversarial component 108 in accordance with one or more embodiments described herein. Repetitive description of like elements employed in other embodiments described herein is omitted for sake of brevity. As shown in FIG. 2, the convergence pathway 200 can comprise one or more normal vectors and tangential vectors determined in a series of iterations by the adversarial component 108 (e.g., by the restoration component 112 and/or the projection component 114).

FIG. 2 can depict a hyperplane in which a constraint contour line 202 separates a first region 204, comprising a first class of features, from a second region 206, comprising a second class of features. The hyperplane (e.g., including the constraint contour line 202, the first region 204, and/or the second region 206) can be generated by the one or more neural network classifiers 106. The convergence pathway 200 depicted in FIG. 2 can be generated by the adversarial component 108 using an $\ell_2$ norm in conjunction with Equation 8. As described herein, "$x_0$" can represent an original input and "x*" can represent a point on the constraint contour line 202 that is nearest the original input. During a first iteration "k" the restoration component 112 can determine one or more normal vectors (e.g., represented by the double line arrows in FIG. 2) with regards to an initial data point "$x^{(k)}$". As shown in FIG. 2, the one or more normal vectors can extend from the initial data point "$x^{(k)}$" directly towards the constraint contour line 202 (e.g., the decision boundary) by following the normal direction to the constraint contour line 202. Thereby, the conveyance pathway can extend from the initial data point "$x^{(k)}$" to an intermediate data point "$z^{(k)}$".

Also during the first iteration, the projection component 114 can determine one or more tangential vectors (e.g., represented by thick bold arrows in FIG. 2) with regards the intermediate data point "$z^{(k)}$". As shown in FIG. 2, the one or more tangential vectors can extend from the intermediate data point "$z^{(k)}$" along the tangent plane of the constraint contour line 202 to reduce the distance to the original input "$x_0$" while keeping the constraint value "c(k)" the same, or substantially the same. Thereby the conveyance pathway can extend to a new data point "$x^{(k+1)}$", which can serve as the initial data point for the next iteration of normal vectors and/or tangential vectors. By computing one or more iterations of normal vectors and/or tangential vectors, the adversarial component 108 can generate a convergence pathway 200 that approaches the nearest data point on the constraint contour line 202 "x*" to the original input "$x_0$".

Figure 3:
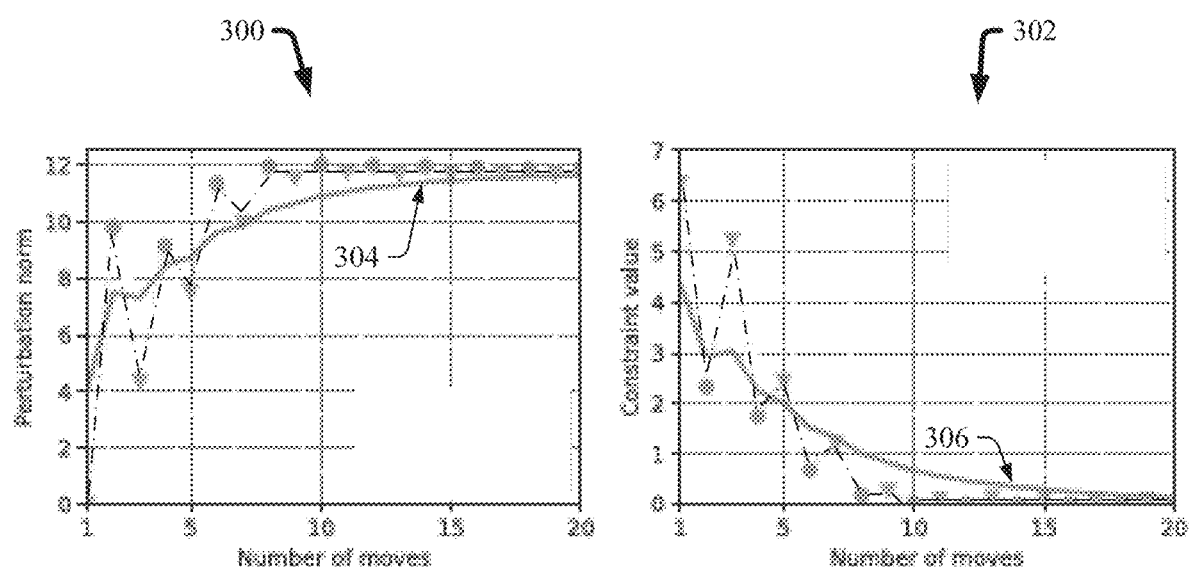
FIG. 3 illustrates a diagram of example, non-limiting graphs that can depict empirical convergence curves characterizing a convergence pathway that can be generated by one or more systems to facilitate a zero-confidence adversarial attack on a neural network classifier in accordance with one or more embodiments described herein.

FIG. 3 illustrates a diagram of an example, non-limiting first graph 300 that can characterize an exemplary convergence pathway 200 by an empirical convergence curve of the perturbation norm. FIG. 3 can also depict an example, non-limiting second graph 302 that can characterize the same exemplary convergence pathway 200 by an empirical convergence curve of the constraint value. Repetitive description of like elements employed in other embodiments described herein is omitted for sake of brevity. The exemplary convergence pathway 200 characterized by the first graph 300 and/or the second graph 302 can be generated by the adversarial component 108 using an $\ell_2$ norm in conjunction with Equation 8 on a randomly chosen CIFAR dataset image.

As shown in the first graph 300 and/or the second graph 302, each transition for a triangle to a circle can be associated with a normal vector, and/or each transition from a circle to a triangle can be associated with a tangential vector. Further, the first line 304 and/or the second line 306 can represented a smoothed depiction of the transitions (e.g., a smoothed version of the plurality of iterations). As shown in the first graph 300 and/or the second graph 302, the one or more normal vectors can reduce the constraint value while slightly increasing the constraint norm, and the one or more tangential vectors can reduce the perturbation norm while slightly affecting the constraint value, wherein the first line 304 and the second line 306 can eventually converge.

Further shown by the first graph 300 and/or the second graph 302, the zero-confidence adversarial attack implemented by the adversarial component 108 can converge quickly (e.g., within 20 iterations in the example depicted in FIG. 3). Therefore, the zero-confidence adversarial attack implemented by the adversarial component 108 can be accelerated. For instance, if margin accuracy is the priority of a user of the system 100, the accuracy can be adjusted to increase by increasing the set number of iterations (e.g., to 200). In another instance, if efficiency is the priority of a user of the system 100, the number of iterations performed by the adversarial component 108 can be set to a smaller number (e.g., 30).

In various embodiments, the constraint function "c(x)" in Equation 2 can be non-convex; thus, a convergence analysis for the one or more zero-confidence adversarial attacks that can be implemented by the adversarial component 108 can be based on the vicinity of a unique local optimum. For example, wherein "x*" can be denoted as one local optimum for Equation 1, and assuming $\nabla c(x^*)$ exists, matrices for the one or more tangential vectors can be defined by the projection component 114 in accordance with Equation 11 below.

$$P = I - s(x^*)(\nabla^T c(x^*)s(x^*))^{-1}\nabla^T c(x^*) \quad (11)$$

Wherein "P" can represent the projection matrix, and "I" can represent matrix/vector transpose. Additionally, wherein the adversarial component 108 considers the neighborhood, $\mathbb{B} = \{x: \|P[x-x^*]\|_2^2 \leq X, |c(x)| \leq C\}$, that can satisfy the following assumptions:

1. (Differentiability) $\forall x \in \mathbb{B}$, $\nabla c(x)$ exists, but can be discontinuous (e.g., all the discontinuity points of the gradient in $\mathbb{B}$ can be jump discontinuities;
2. (Lipschitz Continuity at x*) $\forall x \in \mathbb{B}$, $\|s(x)-s(x^*)\|_2 \leq L_s \|s(x^*)\|_2 \|x-x^*\|_2$;
3. (Bounded Gradient Norm) $\forall x \in \mathbb{B}$, $0 < m \leq \|\nabla c(x)\|_2 \leq M$;
4. (Bounded Gradient Difference) $\exists \delta > 0$, $\forall x, y \in \mathbb{B}$ s.t. y-x=ls(x) ∫ or some l, $\nabla^T c(y)s(x) \geq \delta \nabla^T c(x)s(x)$;
5. (Constraint Convexity) $\exists \gamma \in (0,1)$, $\forall x \in \mathbb{B}$, $(a^{(k)}\nabla d\nabla(x-x_0)+b^{(k)}s(x))^T P^T P(x-x_0) \geq \gamma(x-x_0)^T P^T P(x-x_0)$;
6. (Unique Optimality) x* is the only global optimum within $\mathbb{B}$;
7. (Constant Bounded Normal Vector Size) $\alpha^{(k)} = \alpha < M_\infty$;
8.

(Shrinking Tangential Vector Size) $\beta^{(k)} < \dfrac{\beta}{(k+k_0)^\nu}$, where $0 < \nu < 1$ and $\beta \leq M_\beta, k_0 > m_k$; $|a^{(k)}| < M_a$, $|b^{(k)}| < M_b$;

9. (Presence in Neighborhood) $\exists K$, $x^{(K)} \in \text{int}[\mathbb{B}]$ (e.g., the interior of $\mathbb{B}$.

Then the convergence guarantee of the adversarial attack can be characterized as $$\lim_{k \to \infty} \|x^{(k)} - x^*\|_2 = 0.$$

Wherein "L" can represent the Lipchitz constant, "M" can represent gradient norm upper bound, "ν" can represent tangential vector size decay rate, "γ" can represent convexity lower bound, and/or "K" can represent first presence in Neighborhood.

The first assumption can allow jump discontinuities in $\nabla c(x)$ almost everywhere, which can be a practical assumption for deep neural networks. For example, most neural network operations (e.g., rectified linear unit ("ReLU"), max-pooling, and/or operation of Equation 2) can introduce nothing beyond jump discontinuities in gradient. The third assumption can require the constraint gradient to be lower bounded. However, the gradient boundedness assumption can be imposed in only $\mathbb{B}$, which can be near the decision boundary. Additionally, the fifth assumption can stipulate that c(x) is convex in $\mathbb{B}$ so that the first order optimality condition can readily imply a local minimum instead of a local maximum.

In various embodiments, each dimension of the input features comprised within the hyperplane can be bounded (e.g., $x \in [x_{min}, x_{max}]^n$). To impose a box constraint, the restoration component 112 can modify Equation 3 in accordance with Equation 12 below.

$$z^{(k)} = \arg\min_{x \in [x_{min}, x_{max}]^n} d(x - x^{(k)}), \quad (12)$$

$$\text{s.t. } \nabla^T c(x^{(k)})(x - x^{(k)}) = -\alpha^{(k)} c(x^{(k)})$$

Wherein a solution to Equation 12 can be characterized by Equation 13 below.

$$z^{(k)} = \text{Proj}_{[x_{min}, x_{max}]^n}\{\tilde{z}^{(k)}\}, \quad (13)$$

where $$\tilde{z}^{(k)} = x^{(k)} - \dfrac{\alpha^{(k)} c(x^{(k)}) + \sum_{i \in \mathbb{I}^C} \nabla_i c(x^{(k)})(z_i^{(k)} - x_i^{(k)})}{\sum_{i \in \mathbb{I}} \nabla_i c(x^{(k)}) s_i(x^{(k)})} s(x^{(k)})$$

Wherein "Proj(•)" can be an operator that projects the vector in its argument onto the subset in its subscript, "$\mathbb{I}$" can be a set of indices with which the elements in $\tilde{z}^{(k)}$ can satisfy the box constraint, and "$\mathbb{I}^C$" can be the compliment to $\mathbb{I}$.

Further, in various embodiments, the adversarial component 108 can perform a target-specific normal vector towards each class in the hyperplane and/or choose the normal vector with the shortest distance to develop the convergence pathway. For example, a set of target-specific constraints (e.g., $\{c_i(x) = l_t(x) - l_i(x) - \varepsilon\}$) can be introduced. Thereby the one or more normal vectors can solve Equation 14 below.

$$z^{(k)} = \arg\min_{i \in \mathbb{A}} d(z^{(k,i)} - x_0) \quad (14)$$

Wherein "$z^{(k,i)}$" can be the solution to Equations 3 or 12 with $c(x^{(k)})$ replaced with $c_i(x^{(k)})$, and thus can be equal to Equations 4 or 13 with $c(x^{(k)})$ replaced with $c_i(x^{(k)})$. Also, "$\mathbb{A}$" can represent a set of candidate adversarial classes, which can be all the incorrect classes if the number of classes is small or can be a subset of the adversarial classes with the highest logits otherwise. Equation 14 can be implemented by the adversarial component 108 (e.g., via the restoration component 112) during the first few iterations of the convergence pathway, wherein the closest and highest adversarial classes are likely to be distinct.

Additionally, in one or more embodiments the initialization of the first initial data point "$x^{(0)}$" can be generated by a deterministic input generation process or a random input generation process in accordance with Equation 15 below.

$$x^{(0)}=x_0 \text{ (Deterministic)}, x^{(0)}=x_0+u, u\sim U\{|-u, u|^n\} \text{ (Random)} \quad (15)$$

Wherein "U{|−u, u|$^n$}" can denote the uniform random distribution in "|−u, u|$^n$" (e.g., wherein "u" can represent the initialization perturbation). Also, multiple trials with random initializations can be performed to find a local optimum. Furthermore, in various embodiments, final iterations of the convergence pathway can comprise normal vectors only to ensure the adversarial attack is successful (e.g., c(x)≤ε).

FIG. 4 illustrates a diagram of an example, non-limiting algorithm 400 that can summarize the various features described herein and/or delineate a zero-confidence adversarial attack procedure in accordance with one or more embodiments described herein. Repetitive description of like elements employed in other embodiments described herein is omitted for sake of brevity. As shown in FIG. 4, each iteration of a normal vector and/or a tangential vector can require only one backward propagation, and thus the computational complexity of each move can be comparable to one iteration of most conventional attack algorithms.

Figure 5:
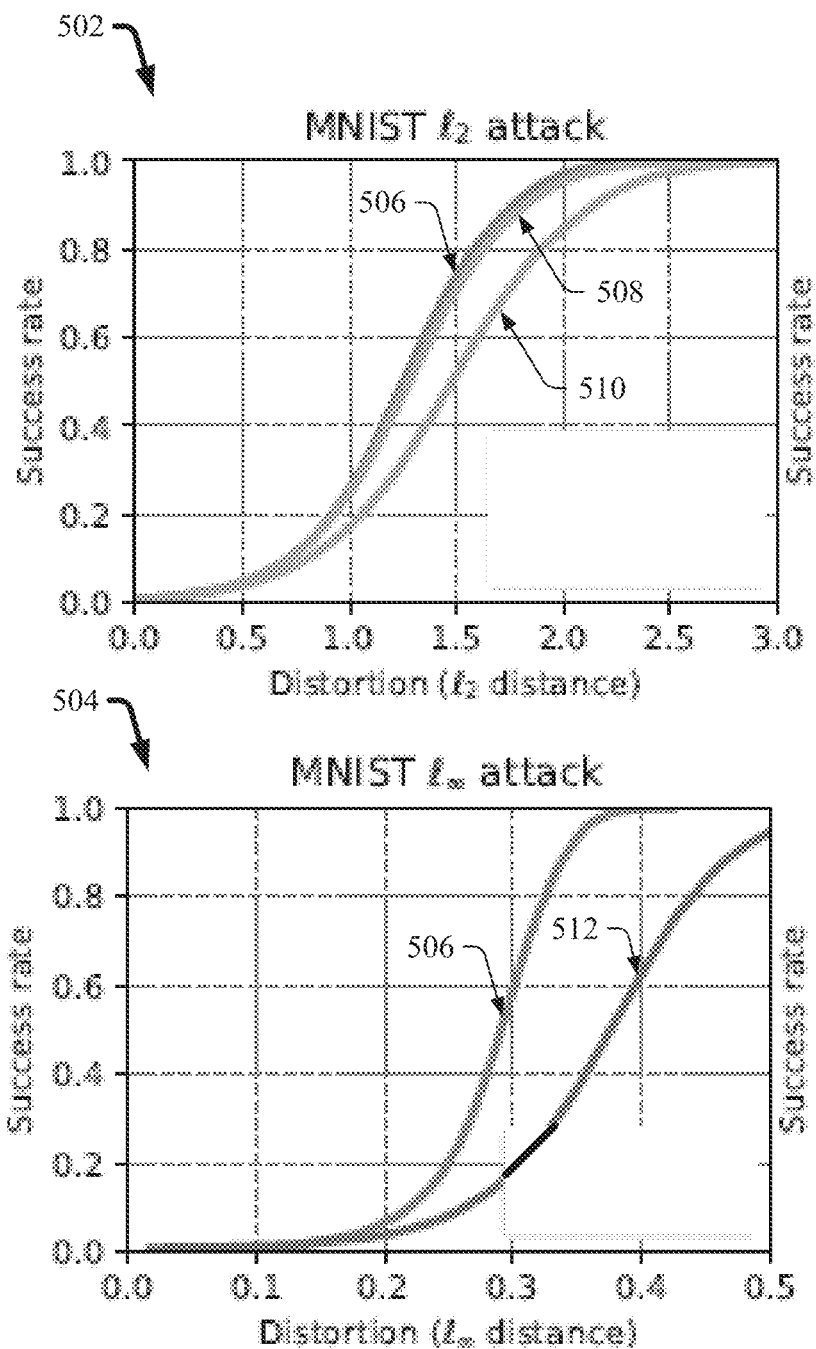
FIG. 5 illustrates a diagram of example, non-limiting graphs that can depict the efficacy of a zero-confidence adversarial attack on a neural network classifier as compared with one or more conventional adversarial attacks in accordance with one or more embodiments described herein.

FIG. 5 illustrates a diagram of example, non-limiting graph 502 and/or graph 504, which can demonstrate the efficacy of the zero-confidence adversarial attack implemented by the adversarial component 108 against a MNIST neural network classifier 106, as compared to conventional adversarial attack techniques, in accordance with one or more embodiments described herein. Repetitive description of like elements employed in other embodiments described herein is omitted for sake of brevity. The neural network classifier 106 trained on MNIST can comprise a stack of two 5×5 convolution layers with 32 and 64 filters respectively, followed by two fully-connected layers with 1,024 hidden units. Also, the range of each pixel can be [0,1].

Graph 502 can characterize an implementation of the zero-confidence adversarial attack implemented by the adversarial component 108 with a $\ell_2$ target and evaluation norm. Graph 504 can characterize an implementation of the zero-confidence adversarial attack implemented by the adversarial component 108 with a $\ell_\infty$ target and evaluation norm. The first line 506 can represent the zero-confidence adversarial attack implemented by the adversarial component 108, wherein the number of iterations can be set to 200 with 10 random starts. The second line 508 can represent the Carlini & Wagner ("CW") adversarial attack, wherein the learning rate can be set to 0.05 and the number of binary steps for multiplier search is 10. Further, the number of iterations for CW can be set to 2,000. The third line 510 can represent the DeepFool adversarial attack, wherein the number of iterations can be set to 200. The fourth line 512 can represent the FGSM adversarial attack, wherein the step size is searched to achieve zero-confidence attack and/or the number of iterations can be set to 200.

Graph 502 and/or graph 504 plots the cumulative density function ("CDF") of the margins of the validation data, which can also be interpreted as the percentage success rate of the subject adversarial attacks as a function of perturbation level. As shown in FIG. 5, the zero-confidence adversarial attack implemented by the adversarial component 108 can outperform the conventional adversarial attacks (e.g., maintaining a 3% advantage over CW).

Figure 6:
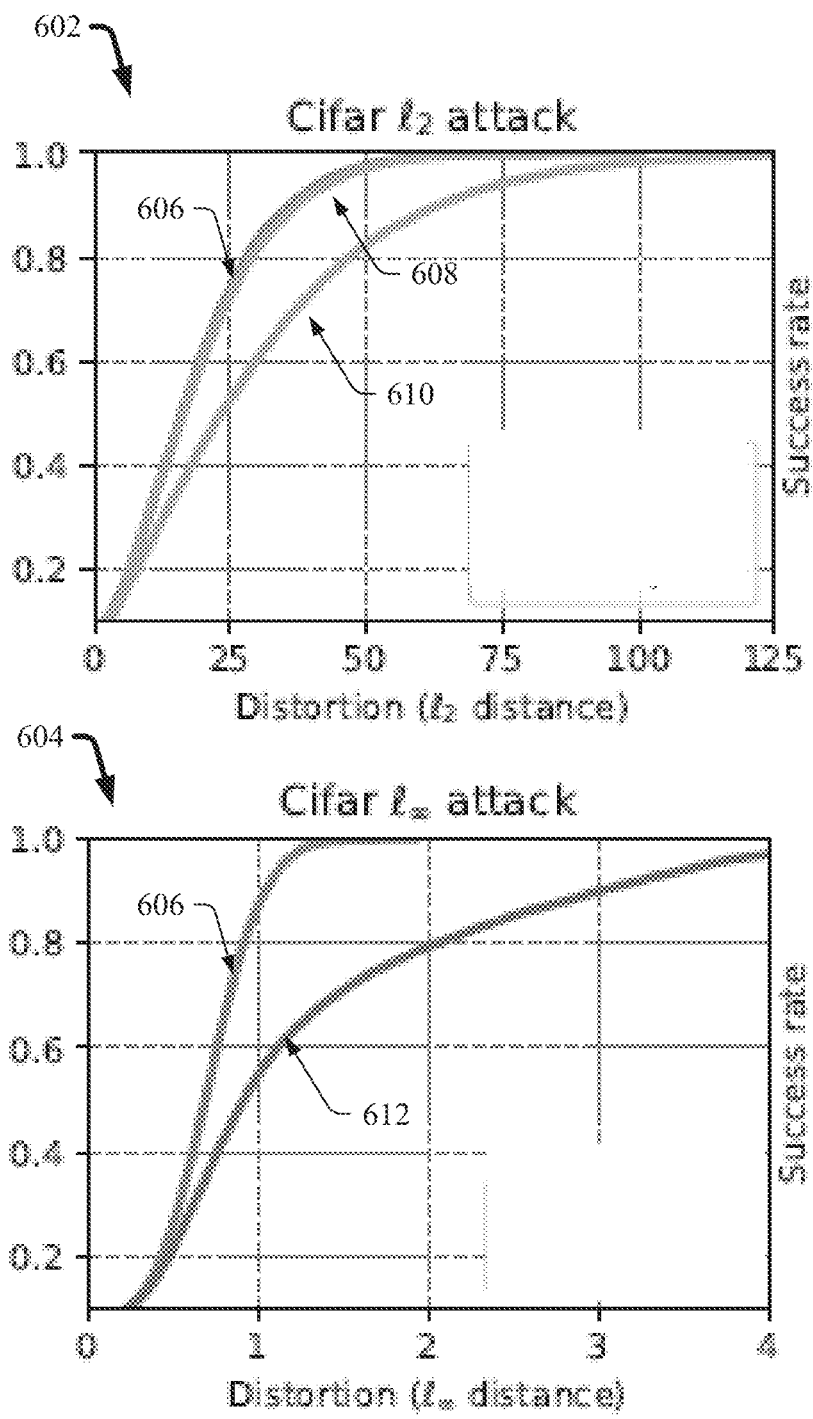
FIG. 6 illustrates a diagram of example, non-limiting graphs that can depict the efficacy of a zero-confidence adversarial attack on a neural network classifier as compared with one or more conventional adversarial attacks in accordance with one or more embodiments described herein.

FIG. 6 illustrates a diagram of example, non-limiting graph 602 and/or graph 604, which can demonstrate the efficacy of the zero-confidence adversarial attack implemented by the adversarial component 108 against a CIFAR neural network classifier 106, as compared to conventional adversarial attack techniques, in accordance with one or more embodiments described herein. Repetitive description of like elements employed in other embodiments described herein is omitted for sake of brevity. The neural network classifier 106 evaluating the CFAR dataset can a pre-trained ResNet32 classifier. Also, the range of each pixel can be [0,255].

Graph 602 can characterize an implementation of the zero-confidence adversarial attack implemented by the adversarial component 108 with a $\ell_2$ target and evaluation norm. Graph 604 can characterize an implementation of the zero-confidence adversarial attack implemented by the adversarial component 108 with a $\ell_\infty$ target and evaluation norm. The first line 606 can represent the zero-confidence adversarial attack implemented by the adversarial component 108, wherein the number of iterations can be set to 200 with 10 random starts. The second line 608 can represent the CW adversarial attack, wherein the learning rate can be set to 0.001 and the number of binary steps for multiplier search is 10. Further, the number of iterations for CW can be set to 2,000. The third line 610 can represent the DeepFool adversarial attack, wherein the number of iterations can be set to 200. The fourth line 612 can represent the FGSM adversarial attack, wherein the step size is searched to achieve zero-confidence attack and/or the number of iterations can be set to 200.

Graph 602 and/or graph 604 plot the CDF of the margins of the validation data, which can also be interpreted as the percentage success rate of the subject adversarial attacks as a function of perturbation level. As shown in FIG. 6, the zero-confidence adversarial attack implemented by the adversarial component 108 can outperform the conventional adversarial attacks (e.g., maintaining a 1% advantage over CW).

Figure 7:
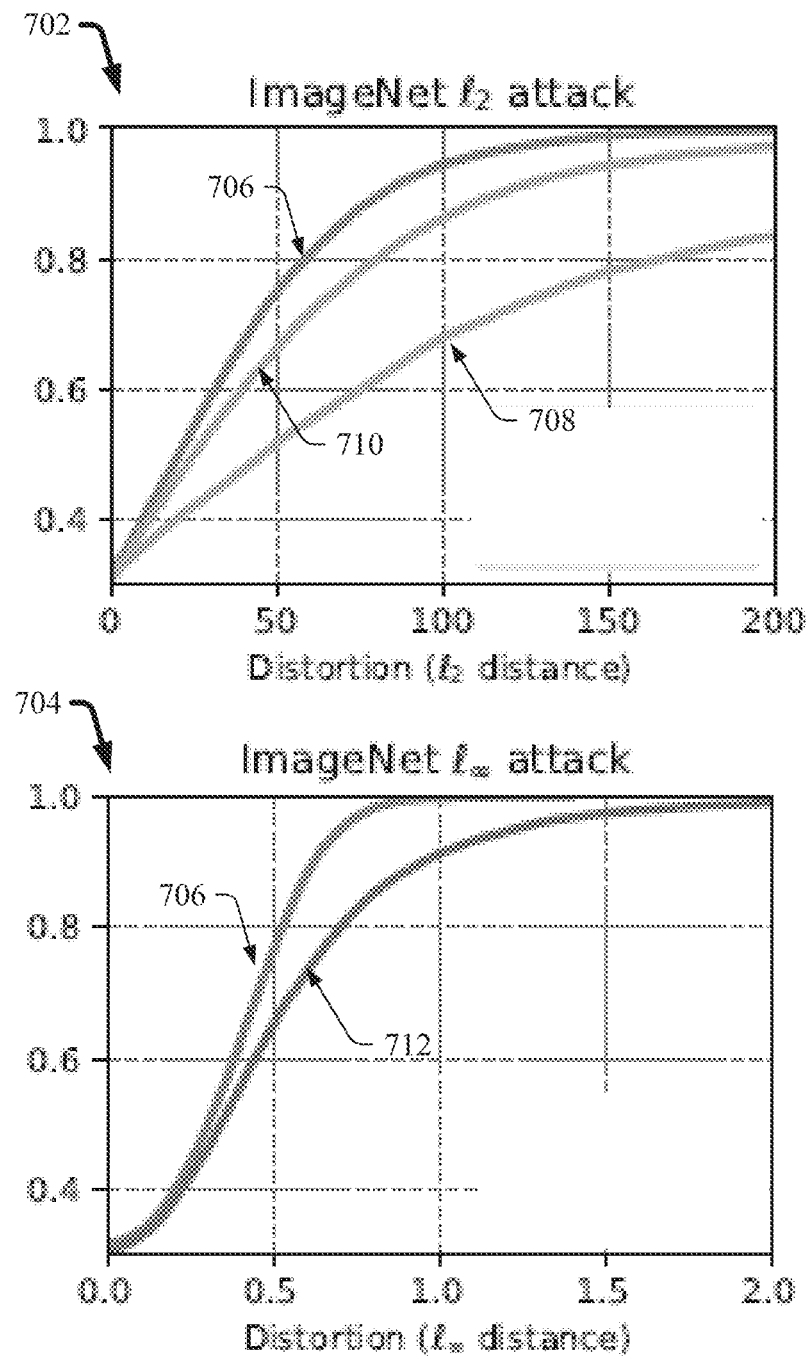
FIG. 7 illustrates a diagram of example, non-limiting graphs that can depict the efficacy of a zero-confidence adversarial attack on a neural network classifier as compared with one or more conventional adversarial attacks in accordance with one or more embodiments described herein.

FIG. 7 illustrates a diagram of example, non-limiting graph 702 and/or graph 704, which can demonstrate the efficacy of the zero-confidence adversarial attack implemented by the adversarial component 108 against an ImageNet neural network classifier 106, as compared to conventional adversarial attack techniques, in accordance with one or more embodiments described herein. Repetitive description of like elements employed in other embodiments described herein is omitted for sake of brevity. The neural network classifier 106 evaluating the ImageNet dataset can a pre-trained ResNet50 classifier, wherein evaluation can be on a validation subset containing 10,000 images and/or the range of each pixel can be [0,255].

Graph 702 can characterize an implementation of the zero-confidence adversarial attack implemented by the adversarial component 108 with a $\ell_2$ target and evaluation norm. Graph 704 can characterize an implementation of the zero-confidence adversarial attack implemented by the adversarial component 108 with a $\ell_\infty$ target and evaluation norm. The first line 706 can represent the zero-confidence adversarial attack implemented by the adversarial component 108, wherein the number of iterations can be set to 200 with 10 random starts. The second line 708 can represent the CW adversarial attack, wherein the learning rate can be set to 0.01 and the number of binary steps for multiplier search is 10. Further, the number of iterations for CW can be set to 2,000. The third line 710 can represent the DeepFool adversarial attack, wherein the number of iterations can be set to 200. The fourth line 712 can represent the FGSM adversarial attack, wherein the step size is searched to achieve zero-confidence attack and/or the number of iterations can be set to 200. Graph 702 and/or graph 704 plot the CDF of the margins of the validation data, which can also be interpreted as the percentage success rate of the subject adversarial attacks as a function of perturbation level. As shown in FIG. 6, the zero-confidence adversarial attack implemented by the adversarial component 108 can outperform the conventional adversarial attacks.

Additionally, the efficacy of the zero-confidence adversarial attack implemented by the adversarial component 108 was compared to the conventional projected gradient descent ("PGD") adversarial attack, wherein the learning rate is set to 0.01 for MNIST, 0.05 for CIFAR, and/or 0.1 for ImageNet. Four perturbation levels for each attack scenario were chosen to facilitate the comparison. The perturbation levels were chosen to roughly follow the 0.2, 0.4, 0.6, and/or 0.8 quantiles of the zero-confidence adversarial attack implemented by the adversarial component 108. Table 1 compares the success rates under the chosen quantiles among attacks with the $\ell_\infty$ target and evaluation norm.

TABLE 1

| ALGORITHM | MNIST<br>0.06/0.08/0.10/0.12 | CIFAR<br>0.2/0.4/0.6/1 | ImageNet<br>0.05/0.1/0.2/0.4 |
|---|---|---|---|
| FGSM | 7.55/13.9/<br>24.9/35.4 | 18.5/31.0/<br>41.1/54.7 | 39.8/47.2/<br>60.1/75.3 |
| PGD | 17.1/42.2/<br>73.7/91.8 | 18.9/38.9/<br>59.1/84.1 | 40.4/49.8/<br>68.8/90.6 |
| Algorithm 400 | 18.1/43.0/<br>74.1/92.1 | 21.1/42.2/<br>62.6/87.3 | 41.5/51.3/<br>69.0/90.8 |

As shown in Table 1, the example algorithm 400 described herein can output perform the conventional attack techniques with regards to each of the neural network classifiers 106.

Furthermore, the efficacy of the zero-confidence adversarial attack implemented by the adversarial component 108 was evaluated on the MNIST Adversarial Examples Challenge, which is a challenge of attacking an MNIST model adversarially trained using PGD with 0.3 perturbation level. The zero-confidence adversarial attack implemented by the adversarial component 108 was executed with 50 random starts and/or the initialization perturbation range was 0.3. Also, the number of iterations was set to 500, the target norm was $\ell_\infty$, "$b_n$" was set to 5, and/or "$a_n$" was set in accordance with Equation 10.

Table 2 depicts the success rates of the different attacks under 0.3 perturbation level. The baseline algorithms were all fix-perturbation attacks. As shown in Table 2, the zero-confidence adversarial attack implemented by the adversarial component 108 performed competitively against the conventional fix-perturbation attacks.

TABLE 2

| Algorithm | Success Rate (%) |
|---|---|
| Zheng et al. | 11.21 |
| Algorithm 400 | 11.16 |
| $1^{st}$-Order on Logit Diff | 11.15 |
| PGD on Cross-Entropy Loss | 10.38 |
| PGD on CW Loss | 10.29 |

Moreover, to further access the efficiency of the zero-confidence adversarial attack implemented by the adversarial component 108, Table 3 compares the running time (e.g., in seconds) of attacking one batch of images. The batch size is 200 for MNIST and/or CIFAR, and/or 100 for ImageNet. Only the $\ell_2$ target and evaluation norm is shown in Table 3 because the other versions can exhibit similar run times. As shown by Table 3, the running time of the zero-confidence adversarial attack implemented by the adversarial component 108 can be much shorter than CW and/or can be comparable to DeepFool and/or PGD.

TABLE 3

| Algorithm | MNIST | CIFAR | ImageNet |
|---|---|---|---|
| CW | 16.02 | 234.75 | 872.28 |
| DeepFool | 1.14 | 21.26 | 44.41 |
| PGD | 0.87 | 33.17 | 46.3 |
| FSGM | 0.11 | 0.95 | 10.05 |
| Algorithm 400 | 3.01 | 51.03 | 248.82 |

Figure 8:
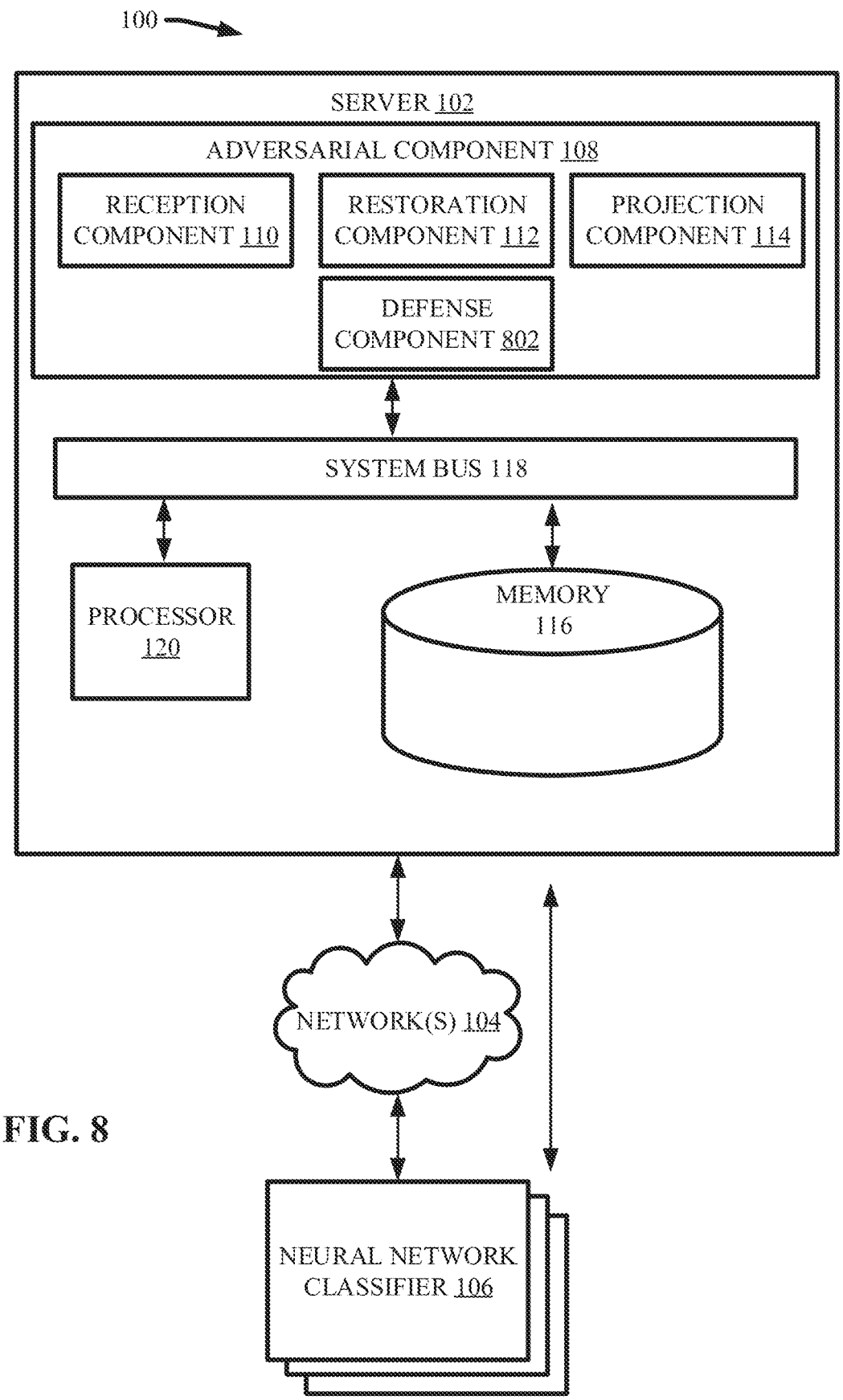
FIG. 8 illustrates a block diagram of an example, non-limiting system that can train a neural network classifier based on a zero-confidence adversarial attack on the neural network classifier in accordance with one or more embodiments described herein.

FIG. 8 illustrates a diagram of the example, non-limiting system 100 further comprising defense component 802 in accordance with one or more embodiments described herein. Repetitive description of like elements employed in other embodiments described herein is omitted for sake of brevity. The defense component 802 can train the one or more neural network classifiers 106 using one or more of the results of the zero-confidence adversarial attack implemented by the adversarial component 108.

As used herein, the term "adversarial training" can refer to an iterative training scheme for a neural network classifier 106 that can make the neural network classifier 106 more robust against adversarial attacks. Each iteration of the adversarial training can consist of two steps. The first step can be to generate a set of adversarial samples that can attack the subject neural network classifier 106. The second step can be to update the neural network classifier 106 by reducing the classification loss on these adversarial samples, such that the updated neural network classifier 106 can classify these adversarial samples more correctly.

To demonstrate the efficacy of training the one or more neural network classifiers 106 based on the zero-confidence adversarial attack implemented by the adversarial component 108, an adversarial training experiment was performed using algorithm 400 on CIFAR as compared to FGSM adversarial training under E perturbation norm. Unlike FGSM, algorithm 400 can aim to find an adversarial example whether or not it falls in the ε perturbation norm. In order to impose the ε perturbation norm constraint, adversarial training was performed on "p" percent of the adversarial images that have the smallest perturbation norm until the average perturbation norm of the lowest "p" percent reached ε. Additionally, the $\ell_\infty$ norm was targeted.

The adversarial training experiment showed that adversarial training with algorithm 400 can achieve a better performance as compared to conventional techniques. For example, the success rate of algorithm 400 under a perturbation norm of 2.5 can reduce from 99.8% to 40.2%, whereas that of FGSM can reduce from 73.2% to 35.4%.

Figure 9:
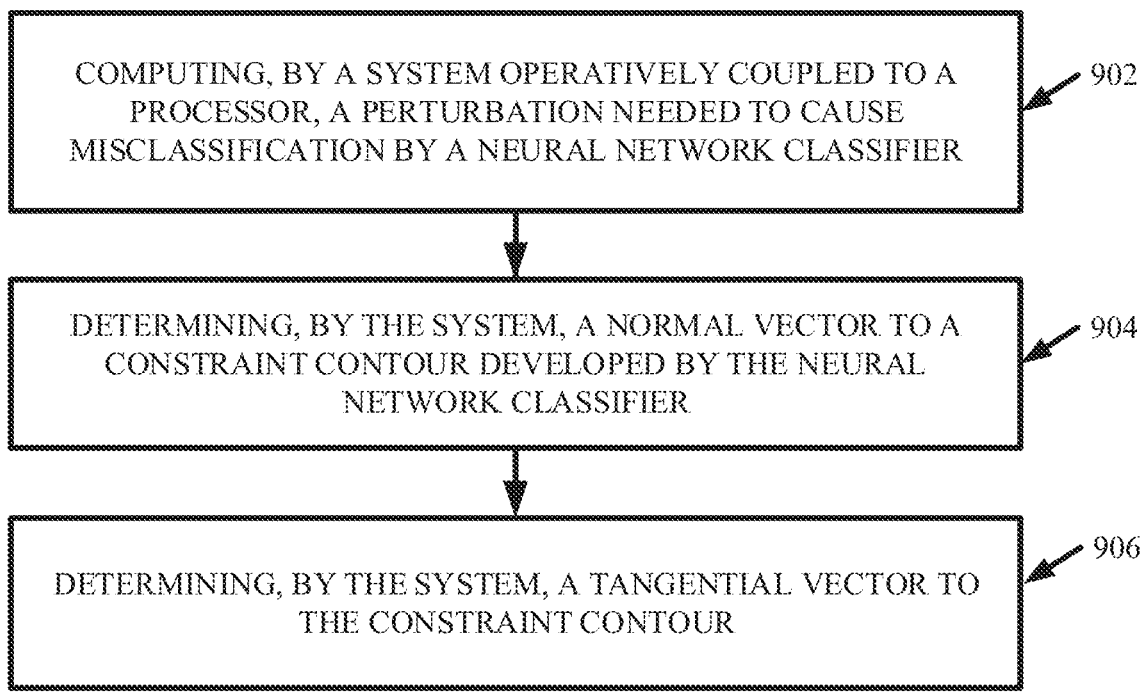
FIG. 9 illustrates a diagram of an example, non-limiting method that can facilitate performing a zero-confidence adversarial attack on a neural network classifier in accordance with one or more embodiments described herein.

FIG. 9 illustrates a flow diagram of an example, non-limiting method 900 that can facilitate performing one or more zero-confidence attack algorithms in accordance with one or more embodiments described herein. Repetitive description of like elements employed in other embodiments described herein is omitted for sake of brevity.

At 902, the method 900 can comprise computing, by a system 100 (e.g., via the adversarial component 108) operatively coupled to a processor 120, a perturbation that causes misclassification by one or more neural network classifiers

106. For example, the computing at 902 can be performed in accordance with algorithm 400 described herein. For instance, the computing at 902 can developing a zero-confidence adversarial attack against the one or more neural network classifiers 106.

At 904, the method 900 can comprise determining, by the system 100 (e.g., via the restoration component 112), one or more normal vectors to a constraint contour (e.g., constraint contour line 202) developed by the one or more neural network classifiers 106. For example, the determining at 904 can be performed in accordance with Equations 3, 12, and 14 described herein. For instance, the constraint contour can be comprised within a hyperplane developed by the one or more neural network classifiers 106. Also, the constraint contour can separate one or more input features from a first class localized in one region of the hyperplane and one or more input features from a second class localized in another region of the hyperplane (e.g., as shown in FIG. 2). In one or more embodiments, the one or more normal vectors can extend along a direction normal to the constraint contour as described with regards to and/or depicted by FIG. 2.

At 906, the method 900 can comprise determining, by system 100 (e.g., via the projection component 114), one or more tangential vectors to the constraint contour (e.g., constraint contour line 202). For example, the determining at 904 can be performed in accordance with Equations 6 described herein. For instance, the one or more tangential vectors can extend along a plane tangent to the constraint contour as described with regards to and/or depicted by FIG. 2. In one or more embodiments, a normal vector and/or a tangential vector in combination can be determine in a first computing iteration to develop a portion of a convergence pathway (e.g., exemplary convergence pathway 200), which can facilitate in computing the perturbation. Further, the convergence pathway can comprise a plurality of iterations, wherein the determining at 904 and/or the determining at 906 can be reiterated between iterations.

Figure 10:
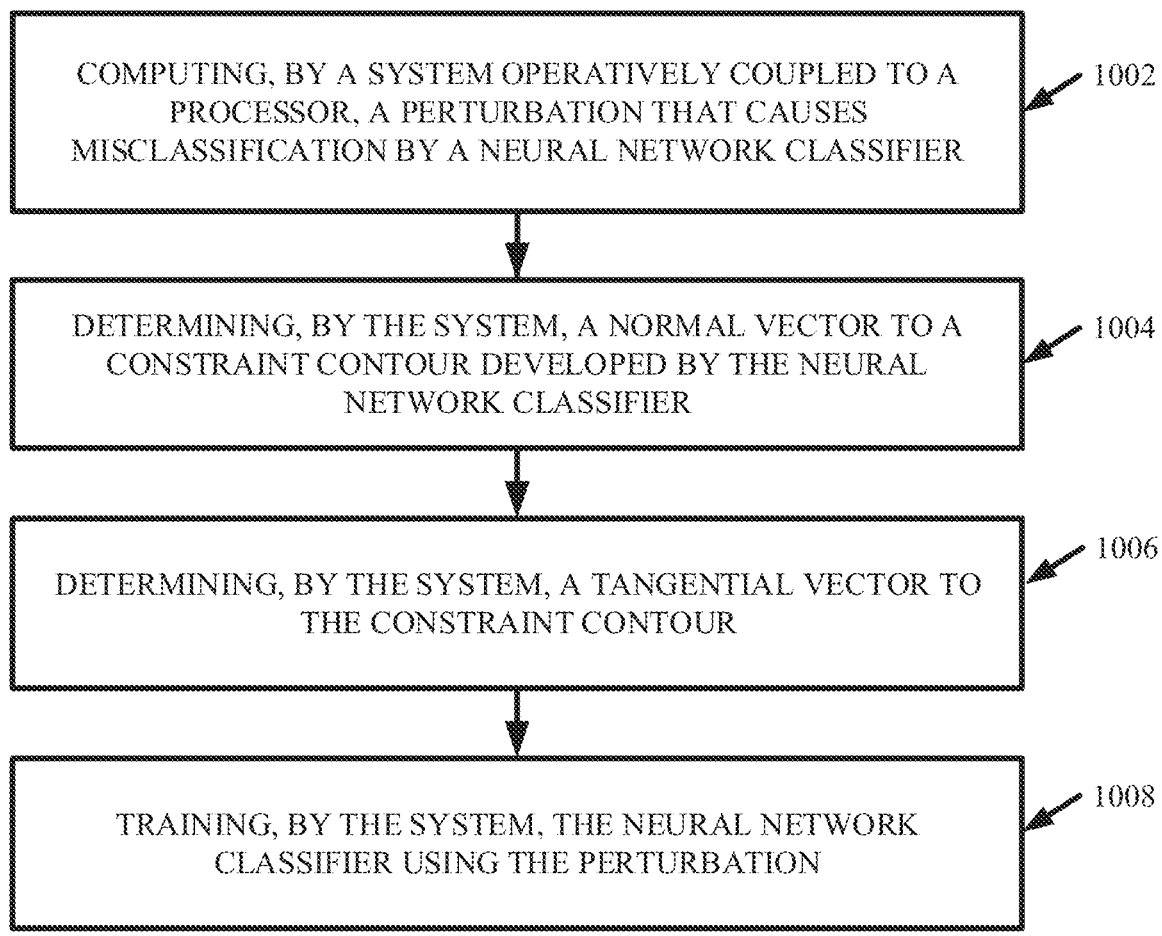
FIG. 10 illustrates a diagram of an example, non-limiting method that can facilitate performing a zero-confidence adversarial attack on a neural network classifier in accordance with one or more embodiments described herein.

FIG. 10 illustrates a flow diagram of an example, non-limiting method 1000 that can facilitate performing one or more zero-confidence attack algorithms in accordance with one or more embodiments described herein. Repetitive description of like elements employed in other embodiments described herein is omitted for sake of brevity.

At 1002, the method 1000 can comprise computing, by a system 100 (e.g., via the adversarial component 108) operatively coupled to a processor 120, a perturbation that causes misclassification by one or more neural network classifiers 106. For example, the computing at 1002 can be performed in accordance with algorithm 400 described herein. For instance, the computing at 1002 can developing a zero-confidence adversarial attack against the one or more neural network classifiers 106.

At 1004, the method 1000 can comprise determining, by the system 100 (e.g., via the restoration component 112), one or more normal vectors to a constraint contour (e.g., constraint contour line 202) developed by the one or more neural network classifiers 106. For example, the determining at 1004 can be performed in accordance with Equations 3, 12, and 14 described herein. For instance, the constraint contour can be comprised within a hyperplane developed by the one or more neural network classifiers 106. Also, the constraint contour can separate one or more input features from a first class localized in one region of the hyperplane and one or more input features from a second class localized in another region of the hyperplane (e.g., as shown in FIG. 2). In one or more embodiments, the one or more normal vectors can extend along a direction normal to the constraint contour as described with regards to and/or depicted by FIG. 2.

At 1006, the method 1000 can comprise determining, by the system 100 (e.g., via the projection component 114), one or more tangential vectors to the constraint contour (e.g., constraint contour line 202). For example, the determining at 1006 can be performed in accordance with Equations 6 described herein. For instance, the one or more tangential vectors can extend along a plane tangent to the constraint contour as described with regards to and/or depicted by FIG. 2. In one or more embodiments, a normal vector and/or a tangential vector in combination can be determine in a first computing iteration to develop a portion of a convergence pathway (e.g., exemplary convergence pathway 200), which can facilitate in computing the perturbation. Further, the convergence pathway can comprise a plurality of iterations, wherein the determining at 1004 and/or the determining at 1006 can be reiterated between iterations.

At 1008, the method 1000 can further comprise training, by the system 100 (e.g., via the defense component 802), the one or more neural network classifiers 106 using the computed perturbation. For example, the accuracy and/or robustness of the one or more neural network classifiers 106 can be enhanced training the one or more neural network classifiers 106 with an adversarial attack (e.g., algorithm 400) capable of inducing errors from which the one or more neural network classifiers 106 can learn.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 11:
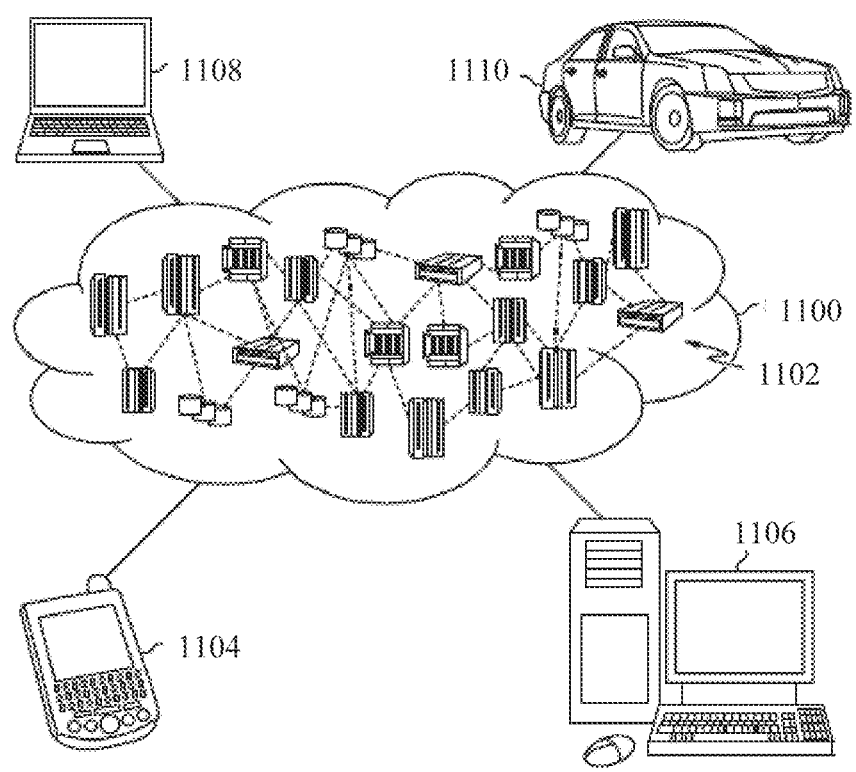
FIG. 11 depicts a cloud computing environment in accordance with one or more embodiments described herein.

Referring now to FIG. 11, illustrative cloud computing environment 1100 is depicted. As shown, cloud computing environment 1100 includes one or more cloud computing nodes 1102 with which local computing devices used by cloud consumers, such as, for example, personal digital assistant (PDA) or cellular telephone 1104, desktop computer 1106, laptop computer 1108, and/or automobile computer system 1110 may communicate. Nodes 1102 may communicate with one another. They may be grouped (not shown) physically or virtually, in one or more networks, such as Private, Community, Public, or Hybrid clouds as described hereinabove, or a combination thereof. This allows cloud computing environment 1100 to offer infrastructure, platforms and/or software as services for which a cloud consumer does not need to maintain resources on a local computing device. It is understood that the types of computing devices 1104-1110 shown in FIG. 11 are intended to be illustrative only and that computing nodes 1102 and cloud computing environment 1100 can communicate with any type of computerized device over any type of network and/or network addressable connection (e.g., using a web browser).

Figure 12:
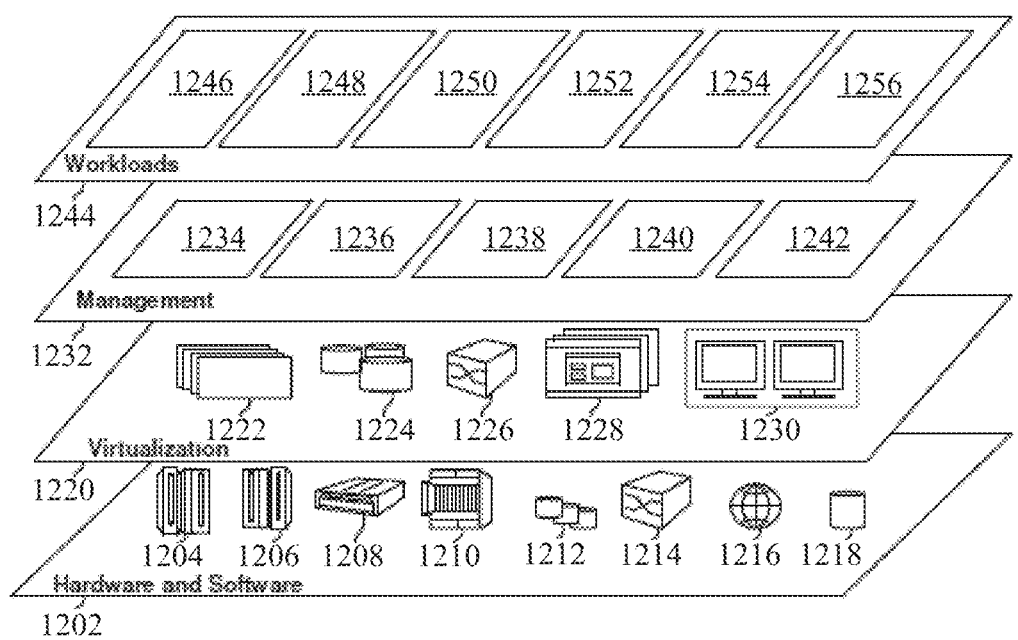
FIG. 12 depicts abstraction model layers in accordance with one or more embodiments described herein

Referring now to FIG. 12, a set of functional abstraction layers provided by cloud computing environment 1100 (FIG. 11) is shown. Repetitive description of like elements employed in other embodiments described herein is omitted for sake of brevity. It should be understood in advance that the components, layers, and functions shown in FIG. 12 are intended to be illustrative only and embodiments of the invention are not limited thereto. As depicted, the following layers and corresponding functions are provided.

Hardware and software layer 1202 includes hardware and software components. Examples of hardware components include: mainframes 1204; RISC (Reduced Instruction Set Computer) architecture based servers 1206; servers 1208; blade servers 1210; storage devices 1212; and networks and networking components 1214. In some embodiments, software components include network application server software 1216 and database software 1218.

Virtualization layer 1220 provides an abstraction layer from which the following examples of virtual entities may be provided: virtual servers 1222; virtual storage 1224; virtual networks 1226, including virtual private networks; virtual applications and operating systems 1228; and virtual clients 1230.

In one example, management layer 1232 may provide the functions described below. Resource provisioning 1234 provides dynamic procurement of computing resources and other resources that are utilized to perform tasks within the cloud computing environment. Metering and Pricing 1236 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1238 provides access to the cloud computing environment for consumers and system administrators. Service level management 1240 provides cloud computing resource allocation and management such that required service levels are met. Service Level Agreement (SLA) planning and fulfillment 1242 provide pre-arrangement for, and procurement of, cloud computing resources for which a future requirement is anticipated in accordance with an SLA.

Workloads layer 1244 provides examples of functionality for which the cloud computing environment may be utilized. Examples of workloads and functions which may be provided from this layer include: mapping and navigation 1246; software development and lifecycle management 1248; virtual classroom education delivery 1250; data analytics processing 1252; transaction processing 1254; and zero-confidence adversarial attack computing 1256. Various embodiments of the present invention can utilize the cloud computing environment described with reference to FIGS.

11 and 12 to execute one or more features of the zero-confidence adversarial attack described herein (e.g., algorithm 400).

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware based systems that perform the specified functions or acts or carry out combinations of special purpose hardware and computer instructions.

Figure 13:
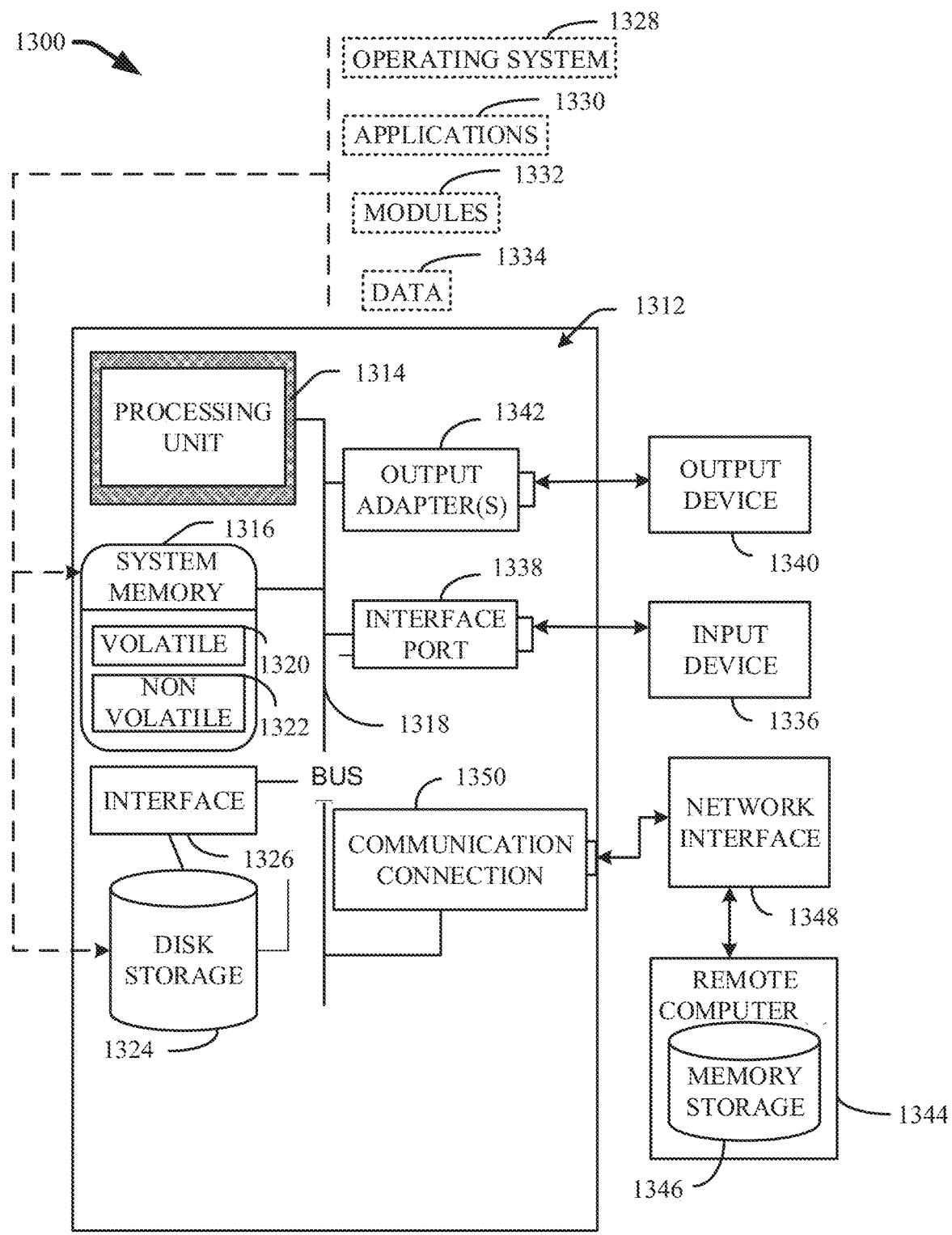
FIG. 13 illustrates a block diagram of an example, non-limiting operating environment in which one or more embodiments described herein can be facilitated.

In order to provide a context for the various aspects of the disclosed subject matter, FIG. 13 as well as the following discussion are intended to provide a general description of a suitable environment in which the various aspects of the disclosed subject matter can be implemented. FIG. 13 illustrates a block diagram of an example, non-limiting operating environment in which one or more embodiments described herein can be facilitated. Repetitive description of like elements employed in other embodiments described herein is omitted for sake of brevity. With reference to FIG. 13, a suitable operating environment 1300 for implementing various aspects of this disclosure can include a computer 1312. The computer 1312 can also include a processing unit 1314, a system memory 1316, and a system bus 1318. The system bus 1318 can operably couple system components including, but not limited to, the system memory 1316 to the processing unit 1314. The processing unit 1314 can be any of various available processors. Dual microprocessors and other multiprocessor architectures also can be employed as the processing unit 1314. The system bus 1318 can be any of several types of bus structures including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire, and Small Computer Systems Interface (SCSI). The system memory 1316 can also include volatile memory 1320 and nonvolatile memory 1322. The basic input/output system (BIOS), containing the basic routines to transfer information between elements within the computer 1312, such as during start-up, can be stored in nonvolatile memory 1322. By way of illustration, and not limitation, nonvolatile memory 1322 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1320 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1312 can also include removable/non-removable, volatile/non-volatile computer storage media. FIG. 13 illustrates, for example, a disk storage 1324. Disk storage 1324 can also include, but is not limited to, devices like a magnetic disk drive, floppy disk drive, tape drive, Jaz drive, Zip drive, LS-100 drive, flash memory card, or memory stick. The disk storage 1324 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1324 to the system bus 1318, a removable or non-removable interface can be used, such as interface 1326. FIG. 13 also depicts software that can act as an intermediary between users and the basic computer resources described in the suitable operating environment 1300. Such software can also include, for example, an operating system 1328. Operating system 1328, which can be stored on disk storage 1324, acts to control and allocate resources of the computer 1312. System applications 1330 can take advantage of the management of resources by operating system 1328 through program modules 1332 and program data 1334, e.g., stored either in system memory 1316 or on disk storage 1324. It is to be appreciated that this disclosure can be implemented with various operating systems or combinations of operating systems. A user enters commands or information into the computer 1312 through one or more input devices 1336. Input devices 1336 can include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices can connect to the processing unit 1314 through the system bus 1318 via one or more interface ports 1338. The one or more Interface ports 1338 can include, for example, a serial port, a parallel port, a game port, and a universal serial bus (USB). One or more output devices 1340 can use some of the same type of ports as input device 1336. Thus, for example, a USB port can be used to provide input to computer 1312, and to output information from computer 1312 to an output device 1340. Output adapter 1342 can be provided to illustrate that there are some output devices 1340 like monitors, speakers, and printers, among other output devices 1340, which require special adapters. The output adapters 1342 can include, by way of illustration and not limitation, video and sound cards that provide a means of connection between the output device 1340 and the system bus 1318. It should be noted that other devices and/or systems of devices provide both input and output capabilities such as one or more remote computers 1344.

Computer 1312 can operate in a networked environment using logical connections to one or more remote computers, such as remote computer 1344. The remote computer 1344 can be a computer, a server, a router, a network PC, a workstation, a microprocessor based appliance, a peer device or other common network node and the like, and typically can also include many or all of the elements described relative to computer 1312. For purposes of brevity, only a memory storage device 1346 is illustrated with remote computer 1344. Remote computer 1344 can be logically connected to computer 1312 through a network interface 1348 and then physically connected via communication connection 1350. Further, operation can be distributed across multiple (local and remote) systems. Network interface 1348 can encompass wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). One or more communication connections 1350 refers to the hardware/software employed to connect the network interface 1348 to the system bus 1318. While communication connection 1350 is shown for illustrative clarity inside computer 1312, it can also be external to computer 1312. The hardware/software for connection to the network interface 1348 can also include, for exemplary purposes only, internal and external technologies such as, modems including regular telephone grade modems, cable modems and DSL modems, ISDN adapters, and Ethernet cards.

Embodiments of the present invention can be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various aspects of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to customize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device including, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components including a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems, computer program products and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a memory that stores computer executable components;
a processor, operably coupled to the memory, and that executes the computer executable components stored in the memory, wherein the computer executable components comprise:
an adversarial component that computes a perturbation that causes misclassification by a neural network classifier;
a restoration component that determines a normal vector to a constraint contour developed by the neural network classifier; and
a projection component that determines a tangential vector to the constraint contour.

2. The system of claim 1, wherein the constraint contour separates input features from a first class and input features from a second class within a hyperplane, and wherein the adversarial component generates a convergence pathway through the hyperplane from an initial input to a nearest point on the constraint contour from an original input.

3. The system of claim 2, wherein the adversarial component generates the convergence pathway to solve an optimization algorithm and compute the perturbation.

4. The system of claim 2, wherein the convergence pathway comprises an iteration of the normal vector followed by the tangential vector.

5. The system of claim 2, wherein the convergence pathway comprises a plurality of iterations of the normal vector followed by the tangential vector.

6. The system of claim 5, wherein the restoration component re-determines the normal vector between iterations from the plurality of iterations, and wherein the projection component re-determines the tangential vector between the iterations from the plurality of iterations.

7. The system of claim 2, wherein the adversarial component incorporates a box constraint when generating the convergence pathway such that the nearest point is an invariant point on the normal vector.

8. The system of claim 7, wherein the initial input is generated by an initialization process selected from a group consisting of a deterministic input generation process and a random input generation process.

9. The system of claim 1, wherein the computer executable components further comprise:
a defense component that trains the neural network classifier using the perturbation.

10. A computer-implemented method, comprising:
computing, by a system operatively coupled to a processor, a perturbation that causes misclassification by a neural network classifier;
determining, by the system, a normal vector to a constraint contour developed by the neural network classifier; and
determining, by the system, a tangential vector to the constraint contour.

11. The computer-implemented method of claim 10, further comprising:
generating, by the system, a convergence pathway through a hyperplane from an initial input to a nearest point on the constraint contour from an original input, wherein the constraint contour separates input features from a first class and input features from a second class within the hyperplane.

12. The computer-implemented method of claim 11, wherein the convergence pathway comprises a plurality of iterations of the normal vector followed by the tangential vector.

13. The computer-implemented method of claim 12, further comprising:
re-determining, by the system, the normal vector between iterations from the plurality of iterations; and
re-determining, by the system, the tangential vector between the iterations from the plurality of iterations.

14. The computer-implemented method of claim 13, wherein the generating the convergence pathway solves is performed in accordance with an optimization algorithm to facilitate the computing the perturbation.

15. The computer-implemented method of claim 13, further comprising:
training, by the system, the neural network classifier using the perturbation.

16. A computer program product for computing a perturbation that causes misclassification by a neural network classifier, the computer program product comprising a computer readable storage medium having program instructions embodied therewith, the program instructions executable by a processor to cause the processor to:
generate, by the processor, a convergence pathway through a hyperplane from an initial input to a point on a constraint contour, wherein the hyperplane is developed by the neural network classifier, and wherein the convergence pathway comprises a normal vector to the constraint contour and a tangential vector to the constraint contour.

17. The computer program product of claim 16, wherein the normal vector extends from the initial input towards the constraint contour to an intermediate point, and wherein the tangential vector extends from the intermediate point along a tangent plane to the constraint contour and towards the point, and wherein the point is a nearest point on the constraint contour from an original input.

18. The computer program product of claim 17, wherein the program instructions cause the processor to:
generate, by the processor, the initial input by an initialization process selected from a group consisting of a deterministic input generation process and a random input generation process.

19. The computer program product of claim 18, wherein the program instructions cause the processor to:
train, by the processor, the neural network classifier using the perturbation.

20. The computer program product of claim 19, wherein generation of the convergence pathway is in a cloud computing environment.

* * * * *